(12) United States Patent
Chen et al.

(10) Patent No.: US 10,219,529 B2
(45) Date of Patent: Mar. 5, 2019

(54) EDIBLE DOG CHEW WITH LENGTHWISE EXTRUDED INTERIOR AND METHOD OF MANUFACTURE

(71) Applicants: Deyu Chen, Wenzhou (CN); Xiang Chen, Wenzhou (CN)

(72) Inventors: Deyu Chen, Wenzhou (CN); Xiang Chen, Wenzhou (CN)

( * ) Notice: Subject to any disclaimer, the term of this patent is extended or adjusted under 35 U.S.C. 154(b) by 238 days.

(21) Appl. No.: 15/061,098

(22) Filed: Mar. 4, 2016

(65) Prior Publication Data

US 2017/0251698 A1    Sep. 7, 2017

(51) Int. Cl.

| A01K 15/02 | (2006.01) |
|---|---|
| A23K 50/42 | (2016.01) |
| A23P 30/20 | (2016.01) |
| A23B 4/03 | (2006.01) |
| A23K 30/20 | (2016.01) |
| A23P 20/15 | (2016.01) |
| A23L 3/40 | (2006.01) |
| A23K 10/35 | (2016.01) |
| A23K 10/22 | (2016.01) |
| A23K 40/30 | (2016.01) |
| A23K 20/163 | (2016.01) |
| A23K 50/40 | (2016.01) |
| A23K 50/45 | (2016.01) |
| A23K 40/25 | (2016.01) |

(Continued)

(52) U.S. Cl.
CPC ............ *A23K 50/42* (2016.05); *A01K 15/026* (2013.01); *A23B 4/03* (2013.01); *A23K 10/20* (2016.05); *A23K 10/22* (2016.05); *A23K 10/30* (2016.05); *A23K 10/35* (2016.05); *A23K 20/163* (2016.05); *A23K 30/20* (2016.05); *A23K 40/25* (2016.05); *A23K 40/30* (2016.05); *A23K 50/40* (2016.05); *A23K 50/45* (2016.05); *A23L 3/40* (2013.01); *A23P 20/15* (2016.08); *A23P 30/20* (2016.08)

(58) Field of Classification Search
CPC .......... A23P 20/10–20/18; A23P 30/20–30/25; A23K 30/20; A23K 40/25; A23K 40/30; A23K 50/40–50/48; A23K 10/20–10/22; A23K 10/30–10/35; A23L 3/40–3/54; A01K 15/025–15/026; A23B 4/03
USPC .......... 426/516–517, 512–513; 119/707–711
See application file for complete search history.

(56) References Cited

U.S. PATENT DOCUMENTS

| 2,613,620 A * | 10/1952 | Allen ................. A21C 11/16 425/461 |
|---|---|---|
| 4,190,679 A * | 2/1980 | Coffee ................. A23K 40/20 426/335 |

(Continued)

OTHER PUBLICATIONS

European Search report of corresponding EP 17158298 dated Jul. 10, 2017, 2 pages.

*Primary Examiner* — Drew E Becker
(74) *Attorney, Agent, or Firm* — Michael D. Eisenberg

(57) ABSTRACT

A method for manufacturing an edible dog chew includes the steps of: extruding a first edible mixture through a mold having an opening in a first direction to form a lengthened chew interior material; cutting the lengthened chew interior material into defined lengths to form at least one cut chew interior material; drying the cut chew interior material to form a chew interior; and coating the chew interior with a second edible mixture different from the first edible mixture. Further methods and pet chews are also provided.

9 Claims, 3 Drawing Sheets

(51) Int. Cl.
*A23K 10/20* (2016.01)
*A23K 10/30* (2016.01)

(56) References Cited

U.S. PATENT DOCUMENTS

| | | | | |
|---|---|---|---|---|
| 5,419,283 | A * | 5/1995 | Leo | A01K 15/026 |
| | | | | 119/709 |
| 6,584,938 | B2 * | 7/2003 | Sherrill | A01K 15/026 |
| | | | | 119/709 |
| 6,783,787 | B2 * | 8/2004 | Bortone | A23G 3/0023 |
| | | | | 425/131.1 |
| 7,264,836 | B2 * | 9/2007 | McHugh | A21C 11/163 |
| | | | | 426/238 |
| 7,282,234 | B2 * | 10/2007 | Shu | A23K 10/20 |
| | | | | 426/302 |
| 8,916,223 | B2 * | 12/2014 | Burgess | A23G 3/0068 |
| | | | | 426/516 |
| 2003/0215547 | A1 * | 11/2003 | Leyh, Jr. | A23P 20/12 |
| | | | | 426/98 |
| 2003/0228400 | A1 * | 12/2003 | Dahl | A23K 40/20 |
| | | | | 426/282 |
| 2005/0244554 | A1 * | 11/2005 | Weinberg | A01K 15/026 |
| | | | | 426/282 |
| 2005/0266146 | A1 * | 12/2005 | Shu | A23K 10/20 |
| | | | | 426/641 |
| 2006/0188611 | A1 * | 8/2006 | Unlu | A23K 40/20 |
| | | | | 426/89 |
| 2006/0243219 | A1 * | 11/2006 | Brown | A01K 15/026 |
| | | | | 119/710 |
| 2007/0031557 | A1 * | 2/2007 | Axelrod | A01K 15/026 |
| | | | | 426/516 |
| 2007/0113796 | A1 * | 5/2007 | Schildgen | A01K 15/026 |
| | | | | 119/709 |
| 2008/0118606 | A1 * | 5/2008 | Stern | A23N 17/005 |
| | | | | 426/92 |
| 2008/0185746 | A1 * | 8/2008 | Axelrod | A01K 15/026 |
| | | | | 264/37.27 |
| 2008/0199569 | A1 * | 8/2008 | Baumeister | A21C 11/16 |
| | | | | 426/94 |
| 2009/0235872 | A1 * | 9/2009 | Filipi | A01K 15/026 |
| | | | | 119/710 |
| 2009/0304897 | A1 * | 12/2009 | Tedman | A23K 40/20 |
| | | | | 426/623 |
| 2010/0257970 | A1 * | 10/2010 | Giefer | F16H 59/0204 |
| | | | | 74/473.21 |
| 2011/0076363 | A1 * | 3/2011 | Niehues | A23K 40/20 |
| | | | | 426/89 |
| 2011/0081453 | A1 * | 4/2011 | Axelrod | B29C 43/222 |
| | | | | 426/62 |
| 2011/0142993 | A1 * | 6/2011 | Bowser | A23K 40/20 |
| | | | | 426/61 |
| 2012/0082762 | A1 * | 4/2012 | Weinberg | A01K 15/026 |
| | | | | 426/92 |
| 2012/0207905 | A1 * | 8/2012 | Axelrod | A23K 40/00 |
| | | | | 426/560 |
| 2014/0220187 | A1 | 8/2014 | Essler | |
| 2014/0255553 | A1 * | 9/2014 | Xu | A23K 40/20 |
| | | | | 426/92 |
| 2014/0290587 | A1 * | 10/2014 | Dixon | A01K 15/026 |
| | | | | 119/709 |
| 2014/0295052 | A1 * | 10/2014 | Elliott | A01K 15/026 |
| | | | | 426/656 |
| 2015/0282504 | A1 * | 10/2015 | Andersen | A23K 20/179 |
| | | | | 426/3 |
| 2015/0351416 | A1 | 12/2015 | Bigeard et al. | |
| 2016/0029664 | A1 * | 2/2016 | Slusarczyk | A23K 40/00 |
| | | | | 426/656 |
| 2016/0302448 | A1 * | 10/2016 | Weinberg | A23K 40/20 |
| 2017/0223987 | A1 * | 8/2017 | Goldstein | A23K 30/20 |

* cited by examiner

EDIBLE DOG CHEW WITH LENGTHWISE EXTRUDED INTERIOR AND METHOD OF MANUFACTURE

The present invention relates to an edible dog chew.

BACKGROUND

Many types of edible dog chews are available on the market. These chews often do not last long, are unhealthy or are expensive to manufacture.

One type of dog chew on the market is NO HIDE™ chicken chews manufactured by Earth Animal. These chews include chicken, chicken gelatin, brown rice flour, organic eggs and olive oil. The chicken is rolled out and baked with organic eggs and olive oil.

FIG. 1 shows a cross section of the chicken chew. A first chew part 4 of circular cross section is rolled and coated on its outer circumference and at the ends with a coating 8. The first chew part 4 surrounds a curled inner chew part 6.

SUMMARY OF THE INVENTION

The prior art chicken chews are expensive to manufacture, due both to the method and the large amount of chicken.

The present invention provides a method for manufacturing an edible dog chew comprising the steps of:
a. extruding a first edible mixture through a mold having an opening in a first direction to form a lengthened chew interior material;
b. cutting the lengthened chew interior material into defined lengths to form at least one cut chew interior material;
c. drying the cut chew interior material to form a chew interior; and
d. coating the chew interior with a second edible mixture different from the first edible mixture.

The first edible mixture preferably is a starch-based mixture, and may include plant-based starches such as corn starches, wheat flour, sweet potato, tapioca flour, potato, or rice flour. The weight percentage of plant-based starches of the first edible mixture preferably is over 50 percent and most preferable over 60 percent.

The first edible mixture also preferably contains an animal-based material such as fresh beef, chicken or fish, preferably in a weight percentage of 10 to 15 percent of the first edible mixture.

The first edible mixture preferably is cooked prior to the extrusion, for example at atmospheric pressure at a temperature of 100 to 110 degrees Celsius.

The length of the lengthened chew interior material preferably is at least 0.5 meters, and may be about 1 meter. The defined lengths preferably are between 5 and 20 centimeters.

The chew interior material preferably is extruded to have a cylindrical shape, with interior lengthwise through openings, and preferably has a diameter of between 1 and 6 centimeters. Most preferably, the chew interior material has a spiral shaped cross section. The spiral shape or through openings aid chewability of the pet chew.

The second edible mixture preferably is fresh meat, such as beef, pork, poultry or fish, mixed with glycerin and a starch, such as rice flour to form a syrup. The syrup sticks to the chew interior upon dipping without the need for further ingredients.

The entire pet chew may then be dried in an oven, preferably between 60 to 70 degrees Celsius, until the water percentage is less than 15%, and preferably between 10 and 13%.

The pet chew may then be sterilized in the oven at a temperature of for example between 90 and 100 degrees Celsius and then packed.

The present invention provides a method for manufacturing an edible dog chew comprising the steps of:
a. extruding a first edible mixture through a mold having an opening with a cylindrical outer shape and at least one mold projection projecting radially into the opening, the extruding taking place in a first direction to form a lengthened chew material;
b. cutting the lengthened chew material into defined lengths to form at least one cut chew material;
c. drying the cut chew material.

The length of the lengthened chew material preferably is at least 0.5 meters, and may be about 1 meter. The defined lengths preferably are between 5 and 20 centimeters.

The chew material preferably has an interior lengthwise through openings created by the mold projection, and preferably has an outer diameter of between 1 and 6 centimeters. Most preferably, the chew material has a spiral shaped cross section. The spiral shape or through openings aid chewability of the pet chew.

The present invention also provides an edible dog chew comprising: a dried extruded edible mixture having a cylindrical outer circumference and a lengthwise through opening; and a coating coating the outer circumference.

The coating preferably also coats the ends of the edible mixture to close the through openings and enter at least partly into the through openings.

Figure 1:
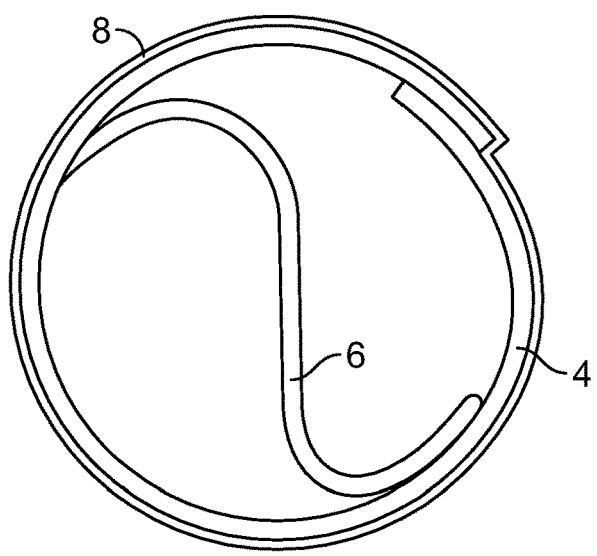
FIG. 1 shows a prior art dog chew described above.
Figure 2:
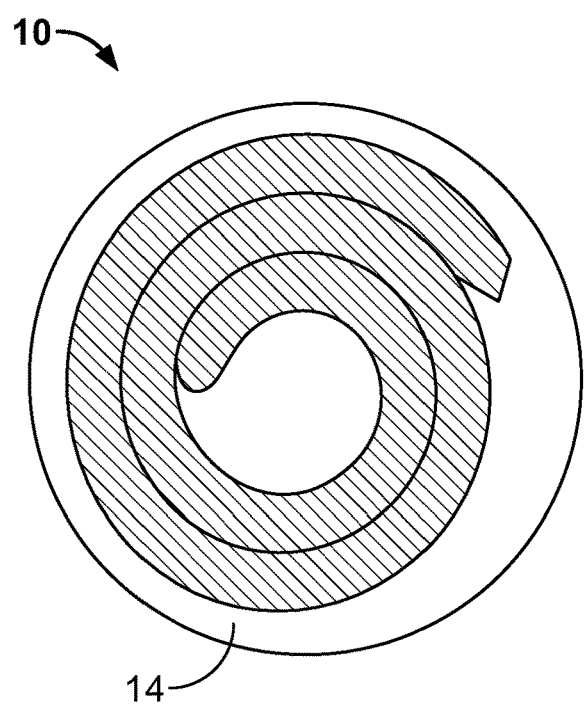
Figure 3:
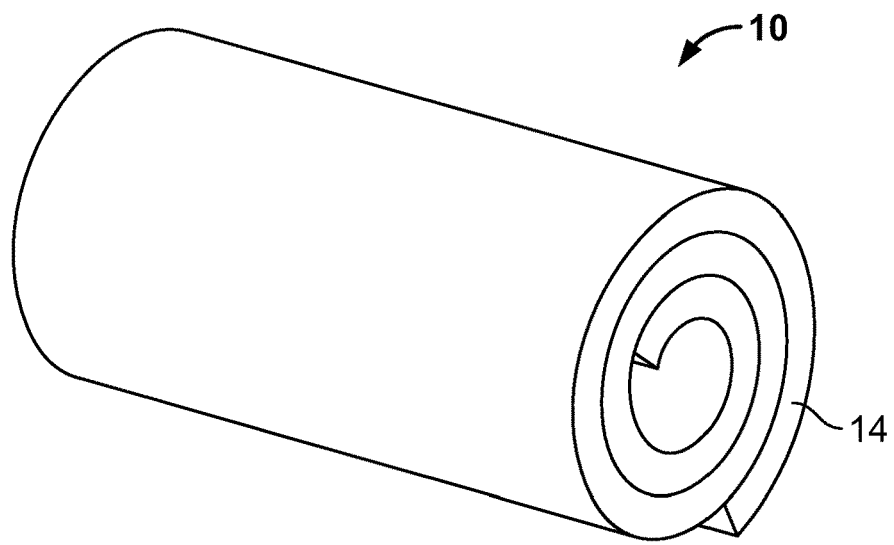

One embodiment of a dog chew according to the present invention is described in detail below based on the following drawings in which:

FIG. 2 shows a cross section of the embodiment;

FIG. 3 shows a perspective view of the embodiment of FIG. 2; and

Figure 4:
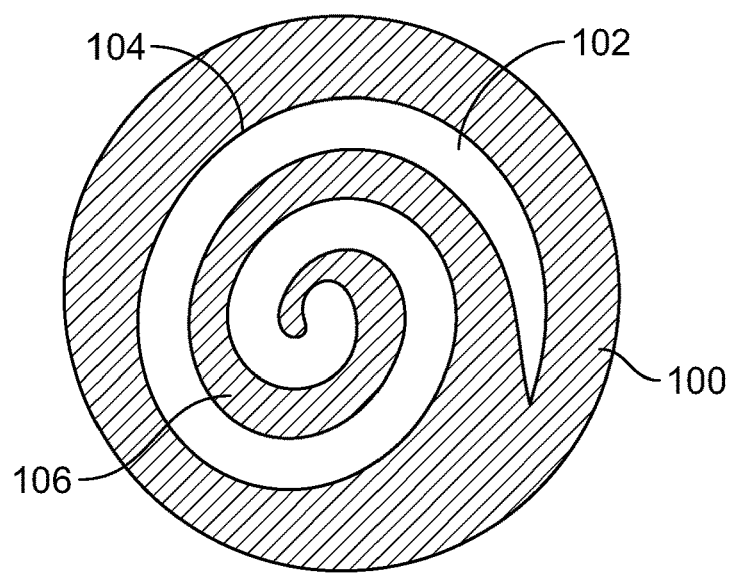

FIG. 4 shows one mold used to form the interior of the embodiment of FIG. 2, and for use with other embodiments according to the present invention.

Figure 5:
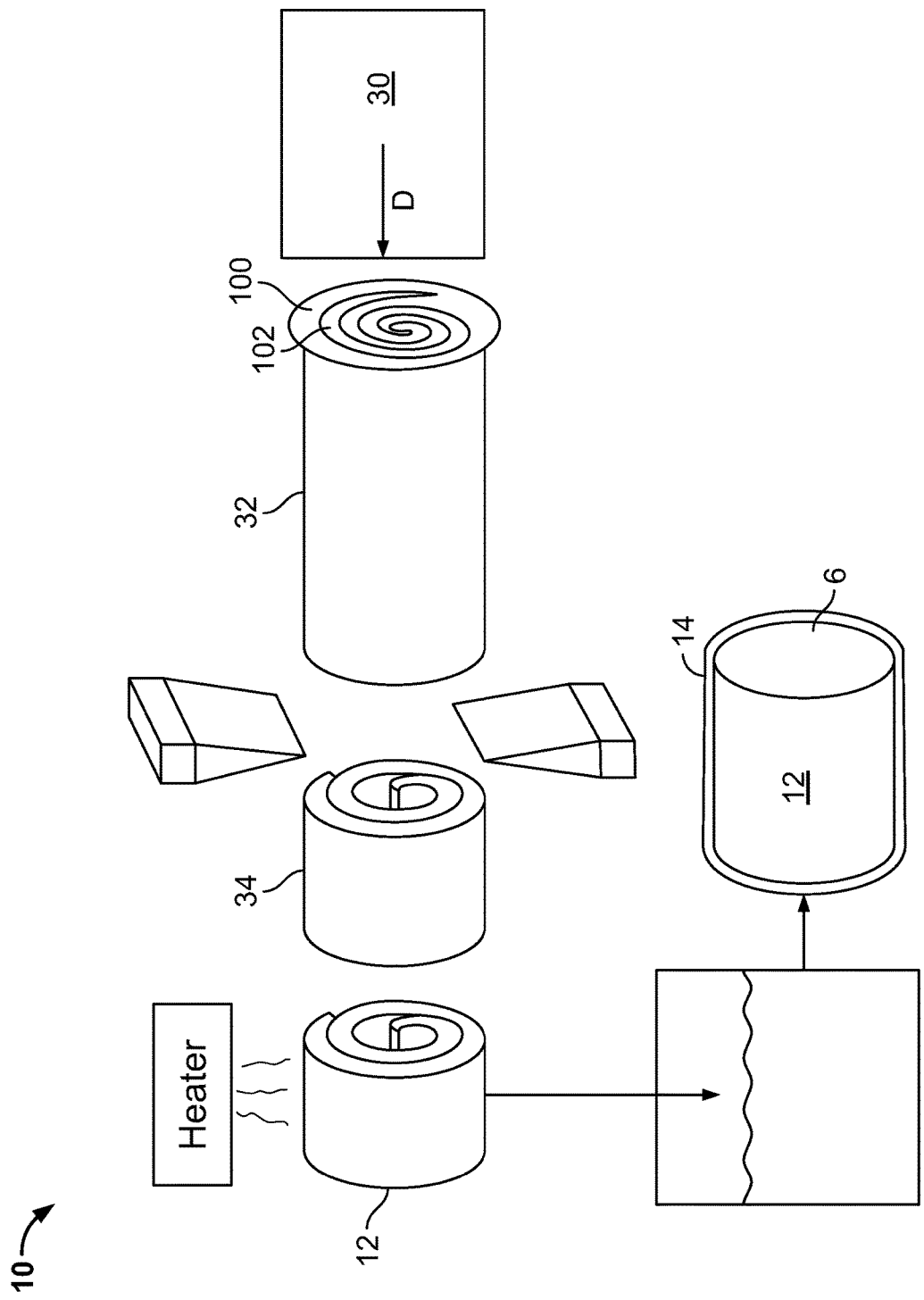

FIG. 5 shows the lengthened chew interior material, being cut and then dipped, in schematic form.

DETAILED DESCRIPTION

FIG. 2 shows a cross section of one embodiment of the dog chew 10 according to the present invention, having a chew interior 12 and a coating 14 coating the chew interior 12.

As shown schematically in FIG. 5, chew interior 12 is formed by pressing a cooked, starch-based first edible mixture 30 through a mold 100 having an opening 102 in a first direction D to form a lengthened chew interior material 32. The lengthened chew interior material 32 is then cut into defined lengths 34 to form at least one cut chew interior material 34. The chew interior material is then dried to form a chew interior 12. The chew interior 12 is then coated by dipping the chew interior 12 in a second edible mixture 40, so that a coating 14 sticks to the chew interior 12. A portion of the coating 14 may enter into at least one through opening at the ends of the chew interior 12, and help seal any crease or opening at the outer circumference of the chew interior 12. The pet chew may then be baked in an oven, and afterwards sterilized in the oven and then packed.

FIG. 3 shows a perspective view of the embodiment of FIG. 2, with an end of the pet chew shown coated by coating 14.

FIG. 4 shows one embodiment of mold 100 used to form the interior of the embodiment of FIG. 2, and for use with other embodiments according to the present invention. The mold 100 has opening 102 with an outer circumference 104 and has a spiral shaped inward projection 106 that permits the extruded chew interior material to have a through opening. Upon drying, the chew interior shrinks so that a longitudinal crease is formed on the outer circumference.

A detailed example of one embodiment is described below:

EXAMPLE 1

Mix Starch Ingredients in Stainless Steel Mixer

Add fresh beef, pork, chicken, duck or fish into the mixer in a weight percentage of 10 to 15% of the starch ingredients Add flavoring and coloring into the mixer until ingredients have a smooth texture Cook the ingredients in the starch-based mixture to a temperature of 100 to 110 degrees Celsius Extrude cooked mixture through extruder with mold to make the roll shape Cut into desired lengths Dry cut lengths in oven and baked at 60 to 70 degrees Celsius until the water percentage is 25%

Form a syrup with beef, pork, chicken or fish (85 to 88% by weight of syrup) and glycerin (5 to 7% by weight) and rice flour (5 to 8% by weight) until it comes the sticky syrup shape Dry the whole product in the oven at 60 to 70 degrees Celsius until the water percentage is 10 to 13%

Sterilize the whole product in the oven at 90 to 100 degrees Celsius and pack

Total weight of ingredients

Plant-based starches (corn starches, wheat flours or sweet potato, tapioca flour, potato, rice flour) 65.9%

Fresh chicken, duck, beef or fish (mackerel, salmon) 16.06%,

Sugar 0.91%

Salt 0.81%

Potassium sorbate 0.1%

Shortening 2.73%

Gelatin 2.69%

Glycerin 10.13%

Coloring 0.67%

The outer coating can be for example 8 to 15 percent of the total weight and the inner chew material 85 to 92% of the total weight of the final product.

An extruded product without the outer coating can also be formed.

What is claimed is:

1. A method for manufacturing an edible dog chew comprising the steps of:
    cooking a first edible mixture at a temperature between 100 and 110 degrees Celsius;
    extruding the first edible mixture through a mold having an opening in a first direction to form a lengthened chew interior material;
    cutting the lengthened chew interior material into defined lengths to form at least one cut chew interior material;
    following the cutting, drying the cut chew interior material to form a chew interior;
    following the drying, coating the chew interior with a second edible mixture different from the first edible mixture; and wherein the first edible mixture is a starch-based mixture and has at least over 50 percent by weight of starch material, and the first edible mixture also includes an animal-based material, wherein the animal-based material is fresh beef, pork, chicken, duck or fish in a weight percentage of 10 to 15 percent of the first edible mixture.

2. The method as recited in claim 1 wherein a length of the lengthened chew interior material is at least 0.5 meters.

3. The method as recited in claim 1 wherein the defined lengths are between 5 and 20 centimeters.

4. The method as recited in claim 1 wherein the first edible mixture is extruded to form the lengthened chew interior material to have a cylindrical shape, with at least one interior through opening.

5. The method as recited in claim 1 wherein the first edible mixture is extruded to form the lengthened chew interior material to have a spiral shaped cross section.

6. The method as recited in claim 1 wherein the second edible mixture is fresh meat mixed with glycerin and a starch.

7. The method as recited in claim 1, comprising comprising further drying the coated chew interior, following the coating.

8. The method of claim 1, wherein the second edible mixture comprises a syrup comprising:
    animal meat forming 85% to 88% by weight of the second edible material;
    glycerin forming 5% to 7% by weight of the second edible material; and
    rice flour forming 5% to 8% by weight of the second edible material.

9. A method for manufacturing an edible dog chew comprising the steps of:
    cooking a first edible mixture at a temperature between 100 and 110 degrees Celsius;
    extruding the first edible mixture through a mold having an opening with a cylindrical outer shape and at least one mold projection projecting radially into the opening, the extruding taking place in a first direction to form a lengthened chew material;
    cutting the lengthened chew material into defined lengths to form at least one cut chew material;
    drying the cut chew material; and wherein the first edible mixture is a starch-based mixture and has at least over 50 percent by weight of starch material, and the first edible mixture also includes an animal-based material, wherein the animal-based material is fresh beef, pork, chicken, duck or fish in a weight percentage of 10 to 15 percent of the first edible mixture.

* * * * *